(12) United States Patent
Gronwald et al.

(10) Patent No.: US 9,325,025 B2
(45) Date of Patent: Apr. 26, 2016

(54) MEMBRANE ELECTRODE ASSEMBLIES AND FUEL CELLS WITH LONG LIFETIME

(75) Inventors: Oliver Gronwald, Frankfurt (DE); Gunter Christ, Diez (DE); Christoph Hartnig, Eppstein (DE)

(73) Assignee: BASF SE (DE)

( * ) Notice: Subject to any disclaimer, the term of this patent is extended or adjusted under 35 U.S.C. 154(b) by 1051 days.

(21) Appl. No.: 13/444,235

(22) Filed: Apr. 11, 2012

(65) Prior Publication Data

US 2012/0264030 A1    Oct. 18, 2012

Related U.S. Application Data

(60) Provisional application No. 61/475,239, filed on Apr. 14, 2011.

(51) Int. Cl.
| | |
|---|---|
| *H01M 8/10* | (2006.01) |
| *B01D 67/00* | (2006.01) |
| *C08G 73/06* | (2006.01) |
| *C08G 73/22* | (2006.01) |
| *C08L 79/04* | (2006.01) |
| *C08K 3/32* | (2006.01) |

(52) U.S. Cl.
CPC ........... *H01M 8/103* (2013.01); *B01D 67/0002* (2013.01); *C08G 73/06* (2013.01); *C08G 73/22* (2013.01); *C08K 3/32* (2013.01); *C08L 79/04* (2013.01); *Y02E 60/521* (2013.01)

(58) Field of Classification Search
None
See application file for complete search history.

(56) References Cited

U.S. PATENT DOCUMENTS

| | | |
|---|---|---|
| 4,191,618 A | 3/1980 | Coker et al. |
| 4,212,714 A | 7/1980 | Coker et al. |
| 4,333,805 A | 6/1982 | Davidson et al. |
| 2004/0075172 A1 | 4/2004 | Bauer et al. |
| 2004/0127588 A1 | 7/2004 | Calumdann et al. |
| 2004/0131909 A1 | 7/2004 | Soczka-Guth et al. |
| 2006/0051648 A1* | 3/2006 | Fujibayashi et al. ............ 429/33 |
| 2006/0138042 A1* | 6/2006 | Okamoto ........... B01D 67/0013 210/490 |
| 2006/0241192 A1* | 10/2006 | Kitamura et al. ............... 521/27 |
| 2008/0050514 A1 | 2/2008 | Calundann et al. |
| 2011/0288187 A1 | 11/2011 | Calundann et al. |
| 2011/0318671 A1* | 12/2011 | Uensal ............... B01D 67/0006 429/492 |

FOREIGN PATENT DOCUMENTS

| | | |
|---|---|---|
| EP | 1337319 A1 | 8/2003 |
| JP | 2001118591 A | 4/2001 |
| JP | 2001-196082 A | 7/2001 |
| WO | WO-96/13872 A1 | 5/1996 |
| WO | WO-01/18894 A2 | 3/2001 |
| WO | WO-02/081547 A1 | 10/2002 |
| WO | WO-02/088219 A1 | 11/2002 |
| WO | WO-03/022412 A2 | 3/2003 |

* cited by examiner

*Primary Examiner* — Alix Eggerding
(74) *Attorney, Agent, or Firm* — Drinker Biddle & Reath LLP

(57) ABSTRACT

The present invention relates to improved membrane electrode assemblies and fuel cells with long lifetime, comprising two electrochemically active electrodes separated by a polymer electrolyte membrane based on polyoxazoles.

25 Claims, 1 Drawing Sheet

Results of measurement of compression resistance

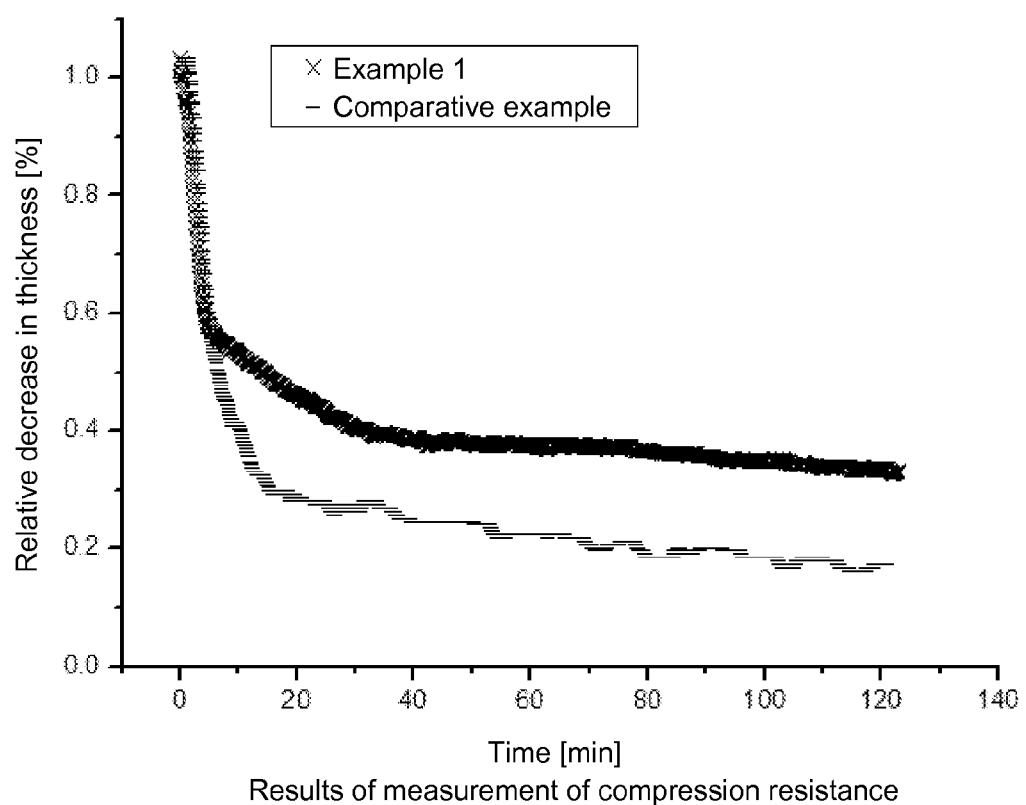
Results of measurement of compression resistance

MEMBRANE ELECTRODE ASSEMBLIES AND FUEL CELLS WITH LONG LIFETIME

CROSS-REFERENCE TO RELATED APPLICATIONS

This application claims benefit (under 35 USC 119(e)) of U.S. Provisional Application 61/475,239, filed Apr. 14, 2011, which is incorporated by reference.

BACKGROUND OF THE INVENTION

The present invention relates to improved membrane electrode assemblies and fuel cells with long lifetime, comprising two electrochemically active electrodes separated by a polymer electrolyte membrane.

In polymer electrolyte membrane (PEM) fuel cells, the proton-conducting membranes used nowadays are almost exclusively sulfonic acid-modified polymers. Predominantly perfluorinated polymers are employed. A prominent example thereof is Nafion™ from DuPont de Nemours, Wilmington, USA. For proton conduction, a relatively high water content in the membrane is required, which is typically 4-20 molecules of water per sulfonic acid group. The water content needed, but also the stability of the polymer in conjunction with acidic water and the hydrogen and oxygen reaction gases, limits the operating temperature of the PEM fuel cell stacks to 80-100° C. Higher operating temperatures cannot be achieved without loss of performance of the fuel cell. At temperatures above the dew point of water for a given pressure level, the membrane dries out completely, and the fuel cell no longer supplies any electrical energy since the resistance of the membrane rises to such high values that there is no longer any significant current flow.

For system-related reasons, however, higher operating temperatures than 100° C. in the fuel cell are desirable. The activity of the noble-metal-based catalysts present in the membrane electrode assembly (MEA) is much better at high operating temperatures.

More particularly, in the case of use of what are called reformates from hydrocarbons, distinct amounts of carbon monoxide are present in the reformer gas and typically have to be removed by a costly and inconvenient gas processing or gas cleaning operation. At high operating temperatures, the tolerance of the catalysts to the CO impurities rises.

In addition, heat arises in the operation of fuel cells. However, cooling of these systems to below 80° C. can be very costly and inconvenient. According to the power released, the cooling apparatus can be made much simpler. This means that, in fuel cell systems which are operated at temperatures above 100° C., the waste heat can be utilized much better and hence the fuel cell system efficiency can be enhanced.

In order to attain these temperatures, membranes with novel conductivity mechanisms are generally used. One approach to doing this is the use of membranes which exhibit ionic conductivity without the use of water. A first promising development in this direction is described in the publication WO 96/13872. A further high-temperature fuel cell is disclosed in the publication JP-A-2001-196082.

In addition, WO 02/088219 discloses a second generation of high-temperature fuel cell based on polyazoles, which are produced by condensation polymerization in polyphosphoric acid (PPA) and partial hydrolysis of the same reaction mixture. These proton-conducting polymer membranes exhibit improved properties compared to the membranes known from WO 96/13872. Nevertheless, these membranes too can still be improved for long-term operation in a high-temperature fuel cell. Especially in the case of sustained use temperatures of 160-180° C. and frequent startup and shutdown of the fuel cell, degradation or aging of the membrane cannot be ruled out. Under some circumstances, this degradation can lead to an irreversible failure of the membrane electrode assembly.

A SUMMARY OF THE INVENTION

It is therefore an object of the present invention to provide an improved proton-conducting polymer membrane which does not have the aforementioned problem and thus leads to an improved MEA.

The inventive membrane or MEA which comprises such a membrane has especially the following properties:

The cells in the case of operation at temperatures above 100° C. should exhibit a long lifetime.

The individual cells should exhibit constant or improved performance at temperatures above 100° C. over a long period.

At the same time, the fuel cells should have, after long operating time, a high zero-load voltage and low gas crossover.

The fuel cells should be usable especially at operating temperatures above 100° C. and not need any additional fuel gas moistening. More particularly, the membrane electrode assemblies should be able to withstand permanent or changing pressure differences between anode and cathode.

In addition, it was therefore an object of the present invention to provide a membrane electrode assembly which can be produced in a simple and inexpensive manner. At the same time, more particularly, a minimum amount of expensive materials was to be used.

More particularly, the fuel cell even after a long time should have a high voltage and be operable at low stoichiometry.

More particularly, the MEA should be robust to different operating conditions (T, p, geometry, etc.) in order to increase general reliability.

Furthermore, expensive noble metal, especially platinum metals, should be exploited very effectively.

We have now found that a specific proton-conducting membrane based on polybenzoxazoles can be obtained, which fulfills the aforementioned profile of requirements.

These objects are achieved by the proton-conducting membrane having all features of claim 1, and the preferred embodiments indicated in the dependent claims, and a membrane electrode assembly comprising an inventive proton-conducting membrane.

The present invention provides a proton-conducting polymer membrane based on polybenzoxazoles, obtainable by a process comprising the steps of (i) mixing (a) one or more aromatic diamino dihydroxy compounds with (b) one or more aromatic carboxylic acids or esters thereof comprising at least two acid groups per carboxylic acid monomer,
or
mixing one or more aromatic and/or heteroaromatic amino hydroxy carboxylic acids
in polyphosphoric acid to form a solution and/or dispersion, (ii) heating the mixture from step (i), preferably under inert gas, to temperatures in the range from 120° C. up to 300° C. to form the polybenzoxazole polymer, (iii) applying a layer using the mixture from step ii) to a support or to an electrode, (iv) at least partially hydrolyzing the polyphosphoric acid present in the layer from step (iii) by contacting with water and/or aqueous media,
(v) detaching the self-supporting membrane formed from the support.

A BRIEF DESCRIPTION OF THE FIGURE

FIG. 1 illustrates the compression resistance of the inventive membrane and of the comparative membrane.

A DETAILED DESCRIPTION OF THE INVENTION

The aromatic diamino dihydroxy compounds used in accordance with the invention are preferably 3,3'-dihydroxy-4,4'-diaminobiphenyl, 3,3'-dihydroxy-4,4'-diaminodiphenyl sulfone, 4,6-diamino-1,3-dihydroxybenzene (DABDO) and salts thereof, especially the mono- and/or dihydrochloride derivatives thereof.

The aromatic carboxylic acids used in accordance with the invention are dicarboxylic acids, or else dicarboxylic acids in combination with tricarboxylic acids and/or tetracarboxylic acids. Instead of the aromatic carboxylic acids, it is also possible to use the esters, anhydrides or acid chlorides thereof. Among the aromatic dicarboxylic acids, preference is given to those in which the acid groups are in the para position on the aromatic ring.

The term "aromatic carboxylic acids" likewise also comprises heteroaromatic carboxylic acids. The aromatic dicarboxylic acids are preferably isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether 4,4'-dicarboxylic acid, benzophenone-4,4'-dicarboxylic acid, diphenyl sulfone 4,4'-dicarboxylic acid, biphenyl-4,4'-dicarboxylic acid, 4-trifluoromethylphthalic acid, 2,2-bis(4-carboxyphenyl)hexafluoropropane, 4,4'-stilbenedicarboxylic acid and 4-carboxycinnamic acid, or the C1-C20-alkyl esters or C5-C12-aryl esters thereof or acid anhydrides thereof or acid chlorides thereof.

The aromatic tricarboxylic acids or the C1-C20-alkyl esters or C5-C12-aryl esters thereof or acid anhydrides thereof or acid chlorides thereof are preferably 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid, 3,5,4'-biphenyltricarboxylic acid.

The aromatic tetracarboxylic acids or the C1-C20-alkyl esters or C5-C12-aryl esters thereof or acid anhydrides thereof or acid chlorides thereof are preferably 3,5,3',5'-biphenyltetracarboxylic acid, 1,2,4,5-benzenetetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

The heteroaromatic carboxylic acids used in accordance with the invention are heteroaromatic dicarboxylic acids, heteroaromatic tricarboxylic acids and heteroaromatic tetracarboxylic acids, or the esters thereof or anhydrides thereof. Heteroaromatic carboxylic acids are understood to mean aromatic systems which comprise at least one nitrogen, oxygen, sulfur or phosphorus atom in the aromatic system. They are preferably pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and the C1-C20-alkyl esters or C5-C12-aryl esters thereof, or acid anhydrides thereof or acid chlorides thereof.

The content of tricarboxylic acid or tetracarboxylic acids (based on the dicarboxylic acid used) is between 0 and 30 mol %, preferably 0.1 and 20 mol %, especially 0.5 and 10 mol %.

The aromatic and/or heteroaromatic amino hydroxy carboxylic acids used in accordance with the invention are preferably 3-amino-4-hydroxybenzoic acid and 4-amino-3-hydroxybenzoic acid.

Preference is given to using, in step A), mixtures of at least 2 different aromatic carboxylic acids. Particular preference is given to using mixtures which comprise, as well as aromatic carboxylic acids, also heteroaromatic carboxylic acids. The mixing ratio of aromatic carboxylic acids to heteroaromatic carboxylic acids is between 1:99 and 99:1, preferably 1:50 to 50:1, especially 1:10 to 10:1.

These mixtures are especially mixtures of N-heteroaromatic dicarboxylic acids and aromatic dicarboxylic acids. Nonlimiting examples thereof are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether 4,4'-dicarboxylic acid, benzophenone-4,4'-dicarboxylic acid, diphenyl sulfone 4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid.

The polyphosphoric acid used in step A) comprises commercial polyphosphoric acids as obtainable, for example, from Riedel-de Haen. The polyphosphoric acids $H_{n+2}P_nO_{3n+1}$ (n>1) typically have a content, calculated as $P_2O_5$ (by acidimetric means) of at least 79.8%, which corresponds to a concentration of min. 110% $H_3PO_4$. Instead of a solution of the monomers, it is also possible to produce a dispersion/suspension.

The mixture obtained in step A) has a weight ratio of polyphosphoric acid to the sum of all monomers of 1:10 000 to 10 000:1, preferably 1:1000 to 1000:1, especially 1:100 to 100:1.

"Polyoxazole" is understood to mean polymers which have at least one oxygen heteroatom and at least one nitrogen heteroatom in the aromatic system. The aromatic system may be mono- or polycyclic and also comprises fused aromatic ring systems. Particular preference is given to aromatic systems in which one aromatic ring has at least one oxygen heteroatom and at least one nitrogen heteroatom.

The aromatic ring is preferably a five- or six-membered ring having one nitrogen atom and one oxygen atom, which may be fused to another ring, especially another aromatic ring.

A polymer having "high thermal stability" in the context of the present invention is one which can be operated for a prolonged period as a polymeric electrolyte in a fuel cell at temperatures above 120° C. "For a prolonged period" means that an inventive membrane can be operated for at least 100 hours, preferably at least 500 hours, at at least 80° C., preferably at least 120° C., more preferably at least 160° C., without any decrease in the performance, which can be measured by the method described in WO 01/18894 A2, by more than 50%, based on the starting performance.

A particularly preferred group of polyoxazole polymers comprises those which comprise repeat oxazole units of the general formula (I) and/or (II) and/or (III) and/or (IV) and/or (V) and/or (VI) and/or (VII)

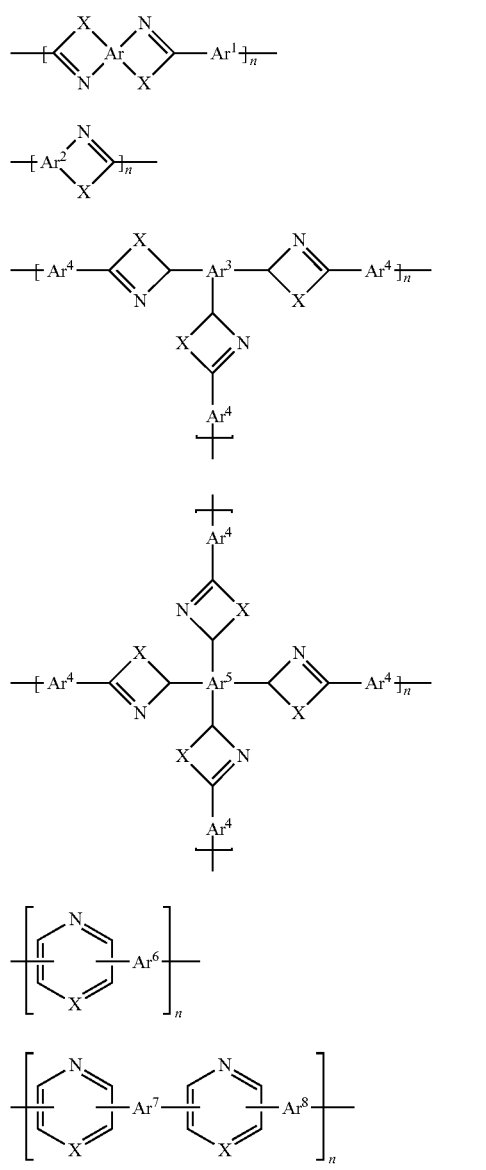

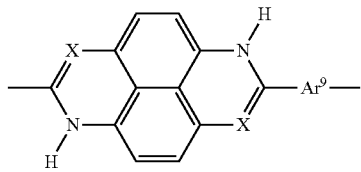

in which
Ar is the same or different and is a tetravalent aromatic or heteroaromatic group, which may be mono- or polycyclic,
$Ar^1$ is the same or different and is a divalent aromatic or heteroaromatic group, which may be mono- or polycyclic,
$Ar^2$ is the same or different and is a di- or trivalent aromatic or heteroaromatic group, which may be mono- or polycyclic,
$Ar^3$ is the same or different and is a trivalent aromatic or heteroaromatic group, which may be mono- or polycyclic,
$Ar^4$ is the same or different and is a trivalent aromatic or heteroaromatic group, which may be mono- or polycyclic,
$Ar^5$ is the same or different and is a tetravalent aromatic or heteroaromatic group, which may be mono- or polycyclic,
$Ar^6$ is the same or different and is a divalent aromatic or heteroaromatic group, which may be mono- or polycyclic,
$Ar^7$ is the same or different and is a divalent aromatic or heteroaromatic group, which may be mono- or polycyclic,
$Ar^8$ is the same or different and is a divalent aromatic or heteroaromatic group, which may be mono- or polycyclic,
$Ar^9$ is the same or different and is a divalent aromatic or heteroaromatic group, which may be mono- or polycyclic,
X is the same or different and is oxygen,
n is an integer greater than or equal to 10, preferably greater than or equal to 100.

Preferred aromatic or heteroaromatic groups derive from benzene, naphthalene, biphenyl, diphenyl ether, diphenylmethane, diphenyldimethylmethane, bisphenone, diphenylsulfone, quinoline, pyridine, bipyridine, pyridazine, pyrimidine, pyrazine, triazine, tetrazine, pyrrole, pyrazole, anthracene, benzopyrrole, benzotriazole, benzoxathiadiazole, benzoxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which may optionally also be substituted.

The substitution pattern of $Ar^1$, $Ar^4$, $Ar^6$, $Ar^7$, $Ar^8$, $Ar^9$ is as desired; in the case of phenylene, for example, $Ar^1$, $Ar^4$, $Ar^6$, $Ar^7$, $Ar^8$, $Ar^9$ may be ortho-, meta- and para-phenylene. Particularly preferred groups derive from benzene and biphenylene, which may optionally also be substituted.

Preferred alkyl groups are short-chain alkyl groups having 1 to 4 carbon atoms, for example methyl, ethyl, n- or i-propyl and t-butyl groups.

Preferred aromatic groups are phenyl or naphthyl groups. The alkyl groups and the aromatic groups may be substituted. Preferred substituents are halogen atoms, for example fluorine, amino groups, hydroxy groups or short-chain alkyl groups, for example methyl or ethyl groups.

Preference is given to polyoxazoles having repeat units of the formula (I) in which the X radicals are the same within one repeat unit.

The polyoxazoles may in principle also have different repeat units which differ, for example, in their X radical. However, it preferably has only identical X radicals in one repeat unit.

Further preferred polyoxazole polymers are polybenzoxazoles.

In a further embodiment of the present invention, the polymer comprising repeat azole units is a copolymer or a blend which comprises at least two units of the formulae (I) to (VII) which differ from one another. The polymers may be in the form of block copolymers (diblock, triblock), random copolymers, periodic copolymers and/or alternating polymers.

In a particularly preferred embodiment of the present invention, the polymer comprising repeat oxazole units is a polyoxazole which comprises only units of the formula (I) and/or (II).

The number of repeat oxazole units in the polymer is preferably an integer greater than or equal to 10. Particularly preferred polymers comprise at least 100 repeat oxazole units.

In the context of the present invention, preference is given to polymers comprising repeat units of the following formulae:

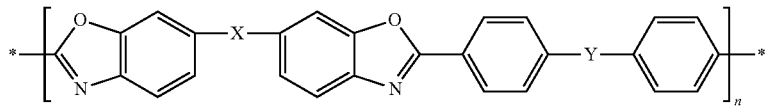

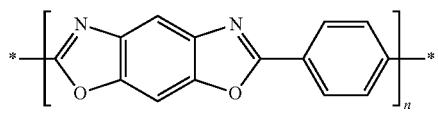 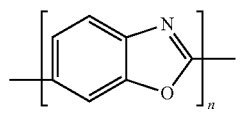 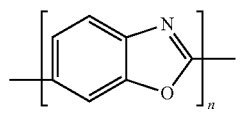

where n in each case is an integer greater than or equal to 10, preferably greater than or equal to 100.

The polyoxazole used, but especially the polybenzoxazoles, are notable for a high molecular weight. Measured as the intrinsic viscosity, it is at least 0.2 dl/g, preferably 0.8 to 10 dl/g, especially 1 to 10 dl/g.

The preparation of polyoxazole is known in principle, the parent monomers being converted to a prepolymer in the melt. The resulting prepolymer solidifies in the reactor and is then mechanically comminuted. The pulverulent prepolymer is typically finally polymerized in a solid phase polymerization at temperatures of up to 400° C.

It is additionally known, especially in the case of preparation of laboratory amounts, that the parent monomers can be condensed in polyphosphoric acid and then precipitated by introduction into water and washed to neutrality.

The aforementioned polyoxazole polymers can be used individually or as a mixture (blend). Preference is given here especially to blends which comprise polyazoles as described in WO 02/088219, WO 02/081547, WO 03/022412, and/or polysulfones. The preferred blend components are polyether sulfone, polyether ketone, and polymers modified with sulfo groups, as described in patent application EP-A-1337319 and US 2004/075172. The use of blends can improve the mechanical properties and reduce the material costs.

When the inventive polyoxazoles, more particularly the polybenzoxazoles, are to be used as a blend, they are admixed with the polymers described hereinafter, but especially with polysulfones and/or polyether sulfone, or added as early as in the course of production of the polyoxazole, for example in step i) (reactor blend).

The preferred polysulfones include especially polysulfone with aromatic and/or heteroaromatic groups in the main chain. In a particular aspect of the present invention, preferred polysulfones and polyether sulfones have a melt volume flow rate MVR 300/21.6 less than or equal to 40 cm$^3$/10 min, especially less than or equal to 30 cm$^3$/10 min and more preferably less than or equal to 20 cm$^3$/10 min, measured to ISO 1133. Preference is given here to polysulfones having a Vicat softening temperature VST/A/50 of 180° C. to 230° C. In another preferred embodiment of the present invention, the number-average molecular weight of the polysulfones is greater than 30 000 g/mol.

The polymers based on polysulfone include especially polymers which have repeat units with linking sulfone groups according to the general formulae A, B, C, D, E, F and/or G:

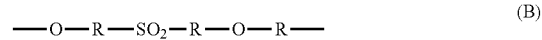

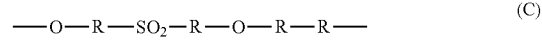

in which the R radicals are the same or different and are each independently an aromatic or heteroaromatic group, these radicals having been elucidated in detail above. These include especially 1,2-phenylene, 1,3-phenylene, 1,4-phenylene, 4,4'-biphenyl, pyridine, quinoline, naphthalene, phenanthrene.

The polysulfones preferred in the context of the present invention include homo- and copolymers, for example random copolymers. Particularly preferred polysulfones comprise repeat units of the formulae H to N:

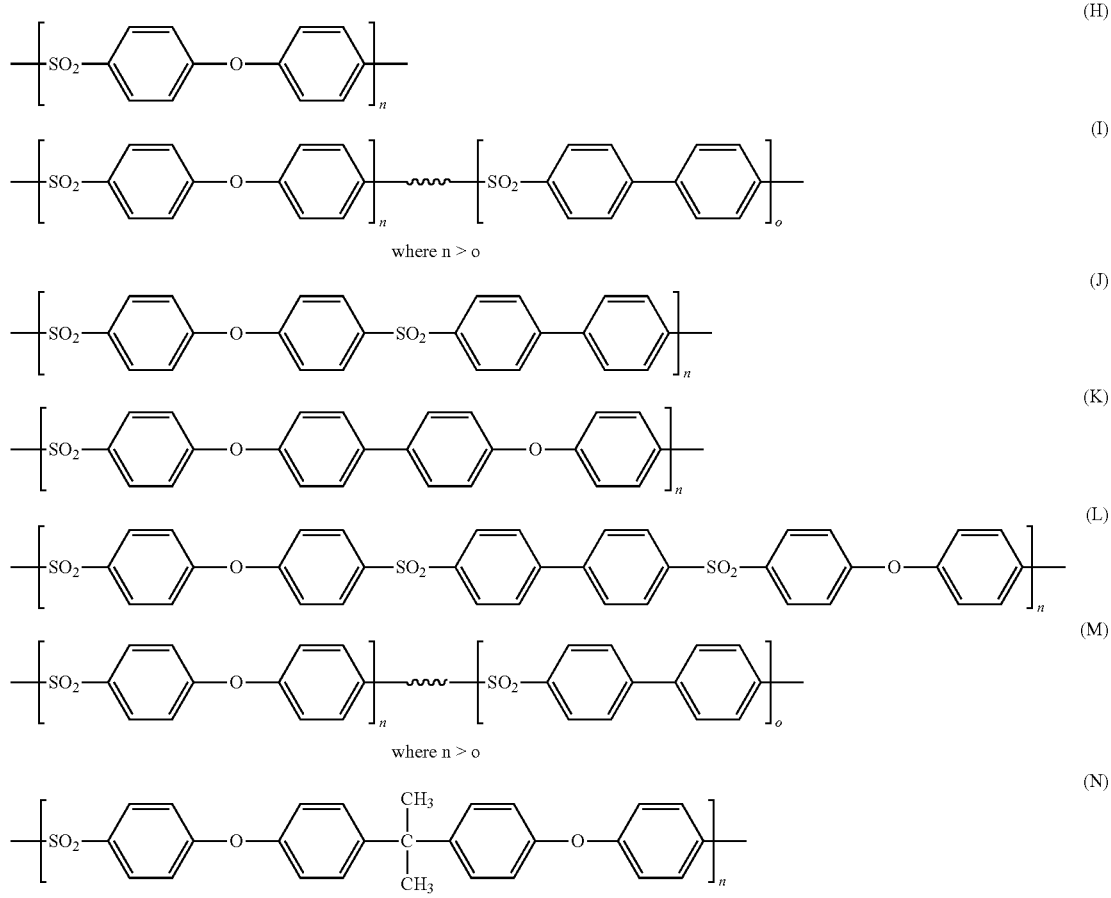

The above-described polysulfones can be obtained commercially under the trade names ®Victrex 200 P, ®Victrex 720 P, ®Ultrason E, ®Ultrason S, ®Mindel, ®Radel A, ®Radel R, ®Victrex HTA, ®Astrel and ®Udel.

In addition, particular preference is given to polyether ketones, polyether ketone ketones, polyether ether ketones, polyether ether ketone ketones and polyaryl ketones. These high-performance polymers are known per se and can be obtained commercially under the trade names Victrex® PEEK™, ®Hostatec, ®Kadel.

Further suitable blend materials are the polyazoles described in WO 02/088219, WO 02/081547, WO 03/022412. These can be obtained by adding the corresponding monomers to the mixture in step i) in polyphosphoric acid. For this purpose, the monomers for the polyazole blend material are used in amounts of up to 100 mol %, based on the monomers for the polyoxazole, such that not more than 50 mol % of polyazole in the blend present and the remaining 50 mol % is polyoxazole. The lower limit is not subject to any restriction, but preference is given to 5 to 10 mol % of monomers of the polyazole based on the monomers for the polyoxazole. Below these amounts, the contributions of the polyazole blend material are very limited. Addition of polyazoles allows the excellent use properties of polyoxazoles to be improved further.

The mixture is heated in step ii) within the temperature range from 120 to 300° C. It is advantageous in this context to increase the temperature stepwise, preferably in intervals of 20-30° C. The duration of the heating is typically between 2 and 100 hours, preferably between 5 and 80 hours.

The layer formation in step iii) is effected by means of measures known per se (casting, spraying, knife-coating), which are known from the prior art for polymer film production. Suitable supports are all supports which can be described as inert under the conditions. To adjust the viscosity, phosphoric acid (conc. phosphoric acid, 85%) can optionally be added to the solution. The viscosity can thus be adjusted to the desired value and the formation of the membrane can be facilitated.

The layer obtained in step iii) has a thickness between 20 and 4000 μm, preferably between 30 and 3500 μm, especially between 50 and 3000 μm.

In one variant of the process, heating in step ii) may also follow formation of the layer in step iii). This thin-layer polymerization is in principle effected within the temperature range from 120 to 300° C., though higher temperatures can also be applied briefly. Instead of a purely thermal heating operation, it is also possible to use high-energy electromagnetic radiation, for example IR and/or NIR radiation, microwaves and the like. In addition, initial heating, for example at the lower end of the temperature range, can also be followed by further heating in the form of said layer.

In one variant of the present invention, the membrane can also be formed directly on the electrode, instead of on a support. The at least partial hydrolysis in step iv) can correspondingly be shortened as a result, since there is no longer any need for the membrane to be self-supporting. Such a membrane also forms part of the subject matter of the present invention.

The at least partial hydrolysis of the polyphosphoric acid still present in step iv) is effected by contacting the membrane present on the support with water and/or an aqueous medium.

The hydrolysis is effected preferably at temperatures above 0° C. and below 200° C., preferably at temperatures between 10° C. and 120° C., especially between room temperature (20° C.) and 90° C. A suitable aqueous medium is water and/or water vapor and/or water-containing phosphoric acid of up to 85%. The hydrolysis is effected preferably under standard pressure, but can also be effected under the action of pressure. It is essential that the treatment proceeds in the presence of sufficient humidity, as a result of which the polyphosphoric acid present is at least partially hydrolyzed. This forms substances including low molecular weight polyphosphoric acid and/or phosphoric acid, which contribute to the consolidation of the membrane. When the ambient air has sufficient air humidity, for example relative humidity min. 30%, the hydrolysis can also be effected by the ambient air.

As well as partial hydrolysis, complete hydrolysis of the polyphosphoric acid present is also possible.

The partial hydrolysis of the polyphosphoric acid in step iv) leads to consolidation of the membrane and to a decrease in the layer thickness, and formation of a membrane which has a thickness between 15 and 3000 μm, preferably between 20 and 2000 μm, especially between 20 and 1500 μm, and which is self-supporting.

The intra- and intermolecular structures present in the polyphosphoric acid layer in step iii) (interpenetrating networks, IPNs) lead, in step iv), to ordered membrane formation which is found to be responsible for the exceptional properties of the membrane formed.

The at least partial hydrolysis in step iv) causes a sol-gel transition and leads to a rubber-like membrane in which the polybenzoxazole acts like a superabsorbent for the polyphosphoric acid/phosphoric acid. The inventive membranes have a high content of phosphoric acid and are not comparable with subsequently doped membranes.

The at least partial hydrolysis (step iv) can also be effected in climate-controlled chambers in which the hydrolysis can be controlled under defined action of moisture. In this case, the humidity can be adjusted in a controlled manner via the temperature or saturation of the contact environment, for example gases such as air, nitrogen, carbon dioxide or other suitable gases, or water vapor. The treatment time depends on the parameters selected above.

In addition, the treatment time depends on the thickness of the membrane.

In general, the treatment time is between a few seconds and minutes, for example under the action of superheated steam, or up to whole days, for example under air at room temperature and low relative air humidity. The treatment time is preferably between 10 seconds and 300 hours, especially 1 minute to 200 hours.

When the at least partial hydrolysis is performed at room temperature (20° C.) with ambient air of relative air humidity 40-80%, the treatment time is between 1 and 200 hours.

The membrane obtained in step iv) can be configured so as to be self-supporting, i.e. it can be detached without damage from the support and then optionally processed further directly.

It is possible to adjust the concentration of phosphoric acid and hence the conductivity of the inventive polymer membrane via the degree of hydrolysis, i.e. the time, temperature and ambient humidity.

The at least partial hydrolysis can also be effected in an aqueous liquid, in which case this liquid may also comprise suspended and/or dispersed constituents. The viscosity of the hydrolysis liquid may be within wide ranges, and the viscosity can be adjusted by adding solvents or increasing the temperature. The dynamic viscosity is preferably in the range from 0.1 to 10 000 mPa*s, especially 0.2 to 2000 mPa*s, these values being measurable, for example, to DIN 53015.

The at least partial hydrolysis in step iv) can be effected by any known method. For example, the membrane obtained in step iii) can be immersed into a liquid bath. In addition, the hydrolysis liquid can be sprayed onto the membrane. The hydrolysis liquid can also be poured over the membrane. The latter methods have the advantage that the concentration of acid in the hydrolysis liquid remains constant during the hydrolysis. However, the first process is frequently less expensive to execute.

The hydrolysis liquid comprises aqueous mixtures of oxygen acids of phosphorus and/or sulfur, especially phosphinic acid, phosphonic acid, phosphoric acid, hypodiphosphonic acid, hypodiphosphoric acid, oligophosphoric acids, sulfurous acid, disulfurous acid and/or sulfuric acid. These acids can be used individually or as a mixture.

The hydrolysis liquid comprises water, though the concentration of the water is generally not particularly critical. In a particular aspect of the present invention, the hydrolysis liquid comprises 5 to 80% by weight, preferably 8 to 70% by weight and more preferably 10 to 50% by weight of water. The amount of water present formally in the oxygen acids is not included in the water content of the hydrolysis liquid.

Among the aforementioned acids, phosphoric acid and/or sulfuric acid are particularly preferred, these acids comprising especially 5 to 70% by weight, preferably 10 to 60% by weight and more preferably 15 to 50% by weight of water.

According to the invention, the concentration of the phosphoric acid is reported as moles of acid per mole of repeat unit of the polymer. In the context of the present invention, a concentration (moles of phosphoric acid based on one repeat unit of the formula $C18H_{10}N_2O_2$, i.e. polybenzoxazole) is between 10 and 50, preferably between 13 and 40 and especially between 15 and 35 mol.

Such high levels of doping (concentrations) are not obtainable by subsequent doping of polymer films.

The inventive membranes comprise preferably between 2 and 15% by weight of polyoxazoles and between 40 and 70% by weight of phosphoric acid, the remaining amount being water. Particular preference is given to polyoxazole contents of 5 to 10% by weight and proportions of phosphoric acid of 50 to 60% by weight, the remaining amount being water.

After the hydrolysis in step iv) or after the detachment in step v), the membrane can also be surface treated by the action of heat in the presence of atmospheric oxygen. This curing of the membrane surface additionally improves the properties of the membrane.

This treatment can also be effected by action of IR or NIR (IR=infrared, i.e. light with a wavelength of more than 700 nm; NIR=near IR, i.e. light with a wavelength in the range from approx. 700 to 2000 nm or an energy in the range from approx. 0.6 to 1.75 eV). A further method is irradiation with β rays. The radiation dose here is between 5 and 200 kGy.

The inventive polymer membrane has improved material properties over the polymer membranes known to date.

The inventive membranes have a good proton conductivity. The proton conductivity at temperatures of 160° C. is at least 0.1 S/cm, preferably at least 0.105 S/cm. The proton conductivity is determined without additional moistening of the gases required.

For additional improvement of the performance properties, fillers, especially proton-conducting fillers, and additional acids can additionally be added to the membrane. The addition can either be effected in step i) or may follow the polymerization.

Nonlimiting examples of proton-conducting fillers are sulfates such as: $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$, phosphates such as $Zr_3(PO_4)_4$, $Zr(HPO_4)_2$, $HZr_2(PO_4)_3$, $UO_2PO_4 \cdot 3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$, polyacid such as $H_3PW_{12}O_{40} \cdot nH_2O$ (n=21-29), $H_3SiW_{12}O_{40} \cdot nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$ selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, phosphides such as ZrP, TiP, HfP oxides such as $Al_2O_3$, $Sb_2O_5$, $ThO_2$, $SnO_2$, $ZrO_2$, $MoO_3$ silicates such as zeolites, zeolites ($NH_4+$), sheet silicates, framework silicates, H-natrolites, H-mordenites, $NH_4$-analcines, $NH_4$-sodalites, $NH_4$-gallates, H-montmorillonites, acids such as $HClO_4$, $SbF_5$ fillers such as carbides, especially SiC, $Si_3N_4$, fibers, especially glass fibers, glass powders and/or polymer fibers, preferably based on polyazoles.

This membrane may also further comprise perfluorinated sulfonic acid additives (0.1-20% by weight, preferably 0.2-15% by weight, very preferably 0.2-10% by weight). These additives lead to improved performance, in the vicinity of the cathode to an increase in the oxygen solubility and oxygen diffusion, and to a reduction in the adsorption of phosphoric acid and phosphate to platinum. (Electrolyte additives for phosphoric acid fuel cells. Gang, Xiao; Hjuler, H. A.; Olsen, C.; Berg, R. W.; Bjerrum, N.J., Chem. Dep. A, Tech. Univ. Denmark, Lyngby, Den., J. Electrochem. Soc. (1993), 140(4), 896-902 and Perfluorosulfonimide as an additive in phosphoric acid fuel cell. Razaq, M.; Razaq, A.; Yeager, E.; DesMarteau, Darryl D.; Singh, S., Case Cent. Electrochem. Sci., Case West. Reserve Univ., Cleveland, Ohio, USA., J. Electrochem. Soc. (1989), 136(2), 385-90.).

Nonlimiting examples of persulfonated additives are: trifluoromethanesulfonic acid, potassium trifluoromethanesulfonate, sodium trifluoromethanesulfonate, lithium trifluoromethanesulfonate, ammonium trifluoromethanesulfonate, potassium perfluorohexanesulfonate, sodium perfluorohexanesulfonate, lithium perfluorohexanesulfonate, ammonium perfluorohexanesulfonate, perfluorohexanesulfonic acid, potassium nonafluorobutanesulfonate, sodium nonafluorobutanesulfonate, lithium nonafluorobutanesulfonate, ammonium nonafluorobutanesulfonate, cesium nonafluorobutanesulfonate, triethylammonium perfluorohexanesulfonate, perfluorosulfoimides and Nafion.

The membrane may also further comprise as additives which scavenge (primary antioxidants) or destroy (secondary antioxidants) the peroxide radicals generated in oxygen reduction in the course of operation and thus, as described in JP2001118591 A2, improve lifetime and stability of the membrane and membrane electrode assembly. The way in which such additives work and their molecular structures are described in F. Gugumus in Plastics Additives, Hanser Verlag, 1990; N. S. Allen, M. Edge Fundamentals of Polymer Degradation and Stability, Elsevier, 1992; or H. Zweifel, Stabilization of Polymeric Materials, Springer, 1998.

Nonlimiting examples of such additives are: bis(trifluoromethyl)nitroxide, 2,2-diphenyl-1-picrinylhydrazyl, phenols, alkylphenols, sterically hindered alkylphenols, for example Irganox, aromatic amines, sterically hindered amines, for example Chimassorb; sterically hindered hydroxylamines, sterically hindered alkylamines, sterically hindered hydroxylamines, sterically hindered hydroxylamine ethers, phosphites, for example Irgafos, nitrosobenzene, methyl-2-nitrosopropane, benzophenone, benzaldehyde tert-butyl nitron, cysteamine, melanines, lead oxides, manganese oxides, nickel oxides, cobalt oxides.

The inventive polymer membrane has additional improved material properties compared to the polymer membranes which are based on polyazoles and are known to date. For instance, the inventive membranes based on polyoxazoles exhibit improved compression resistance. The improved compression resistance results in an improved long-term stability with equal or virtually equal electrochemical performance.

The inventive polyazole membranes have, at operating temperatures of the membrane electrode assemblies of more than 100° C., preferably of 180-200° C., a compression resistance improved by a factor of 2 compared to polybenzimidazole membranes. This is found in an external test cell known to those skilled in the art, by the measurement of the decrease in thickness of a membrane sample within a given time window under the action of a profiled test body at the relevant operating temperatures.

In one modification, the inventive membrane based on polyoxazoles can also be produced by a process comprising the steps of 1) converting a mixture of (a) one or more aromatic diamino dihydroxy compounds and (b) one or more aromatic carboxylic acids or esters thereof comprising at least two acid groups per carboxylic acid monomer, or a mixture of one or more aromatic and/or heteroaromatic amino hydroxy carboxylic acids in the melt at temperatures of up to 350° C., preferably up to 300° C., 2) dissolving the solid prepolymer obtained in step 1) in polyphosphoric acid, 3) heating the solution obtainable in step 2), preferably under inert gas, to temperatures in the range from 120° C. up to 300° C. to form the polybenzoxazole polymer, 4) forming a membrane using the solution of the polybenzoxazole polymer according to step 3) on a support, 5) at least partially hydrolyzing the polyphosphoric acid present in the layer from step (iii) by contacting with water and/or aqueous media, 6) detaching the self-supporting membrane formed from the support.

The process steps described in points 1) to 5) have already been explained in detail above for steps i) to v), and reference is made thereto, especially with regard to preferred embodiments.

The possible fields of use of the inventive doped polymer membranes include use in fuel cells, in electrolysis, in capacitors and in battery systems. Due to their profile of properties, the doped polymer membranes are preferably used in fuel cells.

The present invention also relates to a membrane electrode assembly comprising at least one inventive polymer membrane. For further information about membrane electrode assemblies, reference is made to the technical literature, especially to the U.S. Pat. No. 4,191,618, U.S. Pat. No. 4,212,714 and U.S. Pat. No. 4,333,805. The disclosure in the aforementioned references [U.S. Pat. No. 4,191,618, U.S. Pat. No. 4,212,714 and U.S. Pat. No. 4,333,805] with regard to the construction and the production of membrane electrode assemblies, and the electrodes, gas diffusion layers and catalysts to be selected, also forms part of the description.

The inventive membrane electrode assembly has two gas diffusion layers separated by the polymer electrolyte membrane. Typically used for this purpose are flat, electrically conductive and acid-resistant structures. These include, for example, graphite fiber papers, carbon fiber papers, graphite mesh and/or papers which have been rendered conductive by addition of carbon black. These layers achieve fine distribution of the gas and/or liquid streams.

This layer generally has a thickness in the range from 80 µm to 2000 µm, especially 100 µm to 1000 µm and more preferably 150 µm to 500 µm.

In a particular embodiment, at least one of the gas diffusion layers may consist of a compressible material. In the context of the present invention, a compressible material is characterized by the property that the gas diffusion layer can be compressed to half, especially to one third, of its original thickness without loosing its integrity.

This property is generally possessed by gas diffusion layers composed of graphite mesh and/or paper which has been rendered conductive by addition of carbon black.

As well as the two gas diffusion layers separated by the polymer electrolyte membrane, the inventive membrane electrode assembly also has a catalyst layer on each side of the membrane. The catalyst layer may be present on both sides of the membrane or at the interface of the gas diffusion layer to the membrane.

The catalyst layer(s) comprise(s) catalytically active substances. These include noble metals of the platinum group, i.e. Pt, Pd, Ir, Rh, Os, Ru, or else the noble metals Au and Ag. In addition, it is also possible to use alloys of all aforementioned metals. In addition, at least one catalyst layer may comprise alloys of the platinum group elements with base metals, for example Fe, Co, Ni, Cr, Mn, Zr, Ti, Ga, V etc. In addition, it is also possible to use the oxides of the aforementioned noble metals and/or base metals.

The catalytically active particles which comprise the aforementioned substances can be used in the form of metal powders, known as noble metal blacks, especially platinum and/or platinum alloys. Such particles generally have a size in the range from 5 nm to 200 nm, preferably in the range from 7 nm to 100 nm.

In addition, the metals can also be used on a support material. This support preferably comprises carbon, which can be used especially in the form of carbon black, graphite or graphitized carbon black. In addition, it is also possible to use electrically conductive metal oxides, for example $SnO_x$, $TiO_x$, or phosphates, for example $FePO_x$, $NbPO_x$, $Zr_y(PO_x)_z$ as support material. In these formulae, the indices x, y and z denote the oxygen or metal content of the individual compounds, which may be within a known range, since the transition metals can assume different oxidation states.

The content of these supported metal particles, based on the total weight of the metal-support compound, is generally in the range from 1 to 80% by weight, preferably 5 to 60% by weight and more preferably 10 to 50% by weight, without any intention that this should impose a restriction. The particle size of the support, especially the size of the carbon particles, is preferably in the range from 20 to 1000 nm, especially 30 to 100 nm. The size of the metal particles present thereon is preferably in the range from 1 to 20 nm, especially 1 to 10 nm and more preferably 2 to 6 nm.

The sizes of the different particles are averages and can be determined by means of transmission electron microscopy or x-ray powder diffractometry.

The catalytically active particles detailed above can generally be obtained commercially.

In addition, the catalytically active layer may comprise customary additives. These include fluoropolymers, for example polytetrafluoroethylene (PTFE), proton-conducting ionomers and surface-active substances.

In a particular embodiment of the present invention, the weight ratio of fluoropolymer to catalyst material comprising at least one noble metal and optionally one or more support materials is greater than 0.1, this ratio preferably being in the range from 0.2 to 0.6.

In a particular embodiment of the present invention, the catalyst layer has a thickness in the range from 1 to 1000 μm, especially from 5 to 500 μm, preferably from 10 to 300 μm. This value is an average which can be determined by measuring the layer thickness in the cross section of images obtainable with a scanning electron microscope (SEM).

In a particular embodiment of the present invention, the noble metal content of the catalyst layer is 0.1 to 10.0 mg/cm², preferably 0.3 to 6.0 mg/cm² and more preferably 0.3 to 3.0 mg/cm². These values can be determined by elemental analysis of a flat sample.

The production of inventive membrane electrode assemblies is obvious to the person skilled in the art. In general, the different constituents of the membrane electrode assembly are placed one on top of another and bonded to one another by pressure and temperature. In general, lamination is effected at a temperature in the range from 10 to 300° C., especially 20 to 200° C., and with a pressure in the range from 1 to 1000 bar, especially from 3 to 300 bar.

The finished membrane electrode assembly (MEA) is ready for operation after cooling and can be used in a fuel cell.

The inventive membrane electrode assembly (MEA) is suitable for operation at temperatures above 160° C. and enables gaseous and/or liquid fuels, for example hydrogen-comprising gases, which are prepared, for example, in an upstream reforming step from hydrocarbons. The oxidant used may, for example, be oxygen or air.

A further advantage of the inventive membrane electrode assembly is that they have a high tolerance to carbon monoxide in operation above 120° C. even with pure platinum catalysts, i.e. without a further alloy constituent. At temperatures of 160° C. for example, more than 1% CO may be present in the fuel gas without this leading to any noticeable reduction in the performance of the fuel cell.

The inventive membrane electrode assembly can be operated in fuel cells without any need to moisten the fuel gases and the oxidants in spite of the high operating temperatures possible. The fuel cell nevertheless works stably and the membrane does not lose its conductivity. This simplifies the overall fuel cell system and brings additional cost savings since the control of the water circuit (cooling) is simplified.

The inventive membrane electrode assembly can be cooled without any difficulty to room temperature and below and can then put back into operation, without losing performance.

Furthermore, the inventive MEAs can be produced in an inexpensive and simple manner.

The inventive proton-conducting polymer membrane based on polyoxazoles is notable for a considerable improvement in compression resistance. The inventive membranes exhibit a much lower decrease in thickness at 200° C. For instance, a membrane based on polyoxazoles, in the test method described, still has a residual thickness of min. 50% after 10 minutes at 200° C., while a comparable membrane based on polyazoles (polybenzimidazole) has only a residual thickness of about 40%.

Preferably, an inventive membrane based on polyoxazole, in the test method described, has a residual thickness of min. 40% after 20 minutes at 200° C., while a comparable membrane based on polyazoles (polybenzimidazole) has only a residual thickness of less than 30%.

More preferably, an inventive membrane based on polyoxazole, in the test method described, has a residual thickness of min. 35% after 60 minutes at 200° C., while a comparable membrane based on polyazoles (polybenzimidazole) has only a residual thickness of less than 25%.

General Test Methods:

Test Method for IEC

The conductivity of the membrane depends significantly on the content of acid groups expressed by what is called the ion exchange capacity (IEC). To measure the ion exchange capacity, a sample with a diameter of 3 cm is punched out and introduced into a beaker filled with 100 ml of water. The acid released is titrated with 0.1 M NaOH. Subsequently, the sample is withdrawn, excess water is dabbed off and the sample is dried at 160° C. over 4 h. Then the dry weight, $m_0$, is determined gravimetrically with an accuracy of 0.1 mg. The ion exchange capacity is then calculated from the consumption of the 0.1 M NaOH up to the first titration end point, $V_1$ in ml, and the dry weight, $m_0$ in mg, by the following formula:

$$IEC = V_1 * 300/m_0$$

Test Method for Specific Conductivity

The specific conductivity is measured by means of impedance spectroscopy in a 4-pole arrangement in potentiostatic mode using platinum electrodes (wire, diameter 0.25 mm). The distance between the current-collecting electrodes is 2 cm. The resulting spectrum is evaluated with a simple model consisting of a parallel arrangement of an ohmic resistance and a capacitor. The sample cross section of the phosphoric acid-doped membrane is measured immediately before the sample mounting. To measure the temperature dependence, the test cell is brought to the desired temperature in an oven and regulated by means of a Pt-100 thermocouple positioned in the immediate vicinity of the sample. On attainment of the temperature, the sample is kept at this temperature for 10 minutes before the start of the measurement.

Test Method for Compression Resistance

A membrane specimen of diameter 4.91 cm² (d=2.5 cm) is punched out and positioned on a piece of Kapton film on a hotplate. A metal plunger with three recesses (depth=1 mm, width 2 mm, length 1.5 cm, separation 5 mm in each case) is positioned by means of guide rails on the membrane sample and the compression resistance is assessed by measuring the decrease in thickness at 200° C. (±10° C.) by means of a Mitutoyo DC III for a period of 120 minutes. The decrease in thickness in [%] is calculated by [thickness$_{after}$/thickness$_{start}$]×100.

The present invention is illustrated in detail hereinafter by an example and a comparative example, without any intention that this should impose a restriction.

Example 1

A solution of 4% by weight containing equimolar amounts of 19.76 g of 3,3'-dihydroxy-4,4'-diaminobiphenyl and 15.25 g of terephthalic acid in polyphosphoric acid (116%) is heated to 240° C. within 40 h. The resulting polybenzoxazole-polyphosphoric acid solution is cooled to a temperature of 100° C. and applied by means of a manual coating bar to a support in a 450 µm-thick layer and, after cooling, hydrolyzed in 50% by weight phosphoric acid overnight to obtain a self-supporting polybenzoxazole-phosphoric acid membrane. The membrane properties are listed in Table 1.

Comparative Example

A solution of 2% by weight containing equimolar amounts of 3,3',4,4'-tetraminobiphenyl and terephthalic acid in polyphosphoric acid (112%) is heated to 280° C. within 100 h. The resulting polybenzimidazole-polyphosphoric acid solution is cooled to a temperature of 100° C. and applied by means of a manual coating bar to a support in a 450 µm-thick layer and, after cooling, hydrolyzed in 50% by weight phosphoric acid overnight to obtain a self-supporting polybenzimidazole-phosphoric acid membrane. The membrane properties are listed in Table 1.

TABLE 1

Comparison of the properties of reinforced and standard membrane

|  | Comparative example | Example |
| --- | --- | --- |
| Thickness | 390 µm | 455 µm |
| Phosphoric acid content | 54.1% by wt. | 52.4% by wt. |
| Solids content | 5.6% by wt. | 6.5% by wt. |
| Acid concentration | 57.3% by wt. | 56.0% by wt. |
| Inherent viscosity | 5.7 dL/g | 1.9 dL/g |
| Proton conductivity | 100 mS/cm at 160° C. | 105 mS/cm at 160° C. |

The compression resistance of the inventive membrane and of the comparative membrane are shown in FIG. 1, the measurement having been performed as explained above.

The invention claimed is:

1. A proton-conducting polymer membrane based on polyoxazoles, obtained by a process comprising the steps of
   (i) mixing (a) one or more aromatic diamino dihydroxy compounds with (b) one or more aromatic carboxylic acids or esters thereof comprising at least two acid groups per carboxylic acid monomer,
   or
   mixing one or more aromatic and/or heteroaromatic amino hydroxy carboxylic acids in polyphosphoric acid to form a solution and/or dispersion,
   (ii) heating the mixture from step (i), to temperatures in the range from 120° C. up to 300° C. to form polybenzoxazole polymer,
   (iii) applying a layer using the mixture from step ii) to a support or to an electrode,
   (iv) at least partially hydrolyzing the polyphosphoric acid present in the layer from step (iii) by contacting with water and/or aqueous media,
   (v) detaching the self-supporting membrane formed from the support and
   wherein the membrane has a proton conductivity, measured at 160° C. and without additional moistening of the gases required, of at least 0.1 S/cm and
   the content of polyoxazoles is between 2 and 15% by weight and the content of phosphoric acid between 40 and 70% by weight, and the remaining amount is water.

2. The membrane according to claim 1, wherein the aromatic diamino dihydroxy compounds used are 3,3'-dihydroxy-4,4'-diaminobiphenyl, 3,3'-dihydroxy-4,4'-diaminodiphenyl sulfone, 4,6-diamino-1,3-dihydroxybenzene (DABDO) or their salts thereof, or mono- and/or dihydrochloride derivatives thereof.

3. The membrane according to claim 1, wherein said one or more aromatic carboxylic acids used are isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,5-dihydroxyisophthalic acid, 2,3-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether 4,4'-dicarboxylic acid, benzophenone-4,4'-dicarboxylic acid, diphenyl sulfone 4,4'-dicarboxylic acid, biphenyl-4,4'-dicarboxylic acid, 4-trifluoromethylphthalic acid, 2,2-bis(4-carboxyphenyl) hexafluoropropane, 4,4'-stilbenedicarboxylic acid or 4-carboxycinnamic acid, or the C1-C20-alkyl esters or C5-C12-aryl esters thereof or the acid anhydrides thereof or acid chlorides thereof.

4. The membrane according to claim 1, wherein the aromatic carboxylic acids used are tricarboxylic acids, tetracarboxylic acids or the C1-C20-alkyl esters or C5-C12-aryl esters thereof or the acid anhydrides thereof or the acid chlorides thereof.

5. The membrane according to claim 1, wherein the aromatic carboxylic acids used are 1,3,5-benzenetricarboxylic acid (trimesic acid); 1,2,4-benzenetricarboxylic acid (trimellitic acid); (2-carboxyphenyl)iminodiacetic acid, 3,5,3'-biphenyltricarboxylic acid; 3,5,4'-biphenyltricarboxylic acid or 2,4,6-pyridinetricarboxylic acid or a mixture thereof.

6. The membrane according to claim 1, wherein the aromatic carboxylic acids used are tetracarboxylic acids, the C1-C20-alkyl esters or C5-C12-aryl esters thereof or the acid anhydrides thereof or the acid chlorides thereof.

7. The membrane according to claim 1, wherein the aromatic carboxylic acids used are benzene-1,2,4,5-tetracarboxylic acids; naphthalene-1,4,5,8-tetracarboxylic acids, 3,5, 3',5'-biphenyltetracarboxylic acid; benzophenonetetracarboxylic acid, 3,3',4,4'-biphenyltetracarboxylic acid, 2,2',3,3'-biphenyltetracarboxylic acid, 1,2,5, 6-naphthalenetetracarboxylic acid or 1,4,5,8-naphthalenetetracarboxylic acid.

8. The membrane according to claim 1, wherein the content of tricarboxylic acid or tetracarboxylic acids (based on the dicarboxylic acid used) is between 0 and 30 mol %.

9. The membrane according to claim 4, wherein the content of tricarboxylic acid or tetracarboxylic acids (based on the dicarboxylic acid used) is between 0.5 and 10 mol %.

10. The membrane according to claim 1, wherein the heteroaromatic amino hydroxy carboxylic acids used are heteroaromatic dicarboxylic acids and tricarboxylic acids and tetracarboxylic acids which comprise at least one nitrogen, oxygen, sulfur or phosphorus atom in the aromatic system.

11. The membrane according to claim 1, wherein the heteroaromatic amino hydroxy carboxylic acids used are pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, or the C1-C20-alkyl esters or C5-C12-aryl esters thereof, or acid anhydrides thereof or acid chlorides thereof.

12. The membrane according to claim 1, wherein the aromatic and/or heteroaromatic amino hydroxy carboxylic acids used are 3-amino-4-hydroxybenzoic acid or 4-amino-3-hydroxybenzoic acid.

13. The membrane according to claim 1, wherein, in step A), a polyphosphoric acid with a content, calculated as $P_2O_5$ (by acidimetric means) of at least 79.8% is used, which corresponds to a concentration of min. 110% $H_3PO_4$.

14. The membrane according to claim 1, wherein the polyoxazole polymer comprises repeat oxazole units of the general formula (I) and/or (II) and/or (III) and/or (IV) and/or (V) and/or (VI) and/or (VII)

in which
Ar is the same or different and is a tetravalent aromatic or heteroaromatic group, which is optionally mono- or polycyclic,
$Ar^1$ is the same or different and is a divalent aromatic or heteroaromatic group, which is optionally mono- or polycyclic,
$Ar^2$ the same or different and is a di- or trivalent aromatic or heteroaromatic group, which is optionally mono- or polycyclic,
$Ar^3$ is the same or different and is a trivalent aromatic or heteroaromatic group, which is optionally mono- or polycyclic,
$Ar^4$ is the same or different and is a trivalent aromatic or heteroaromatic group, which is optionally mono- or polycyclic,
$Ar^5$ is the same or different and is a tetravalent aromatic or heteroaromatic group, which is optionally mono- or polycyclic,
$Ar^6$ is the same or different and is a divalent aromatic or heteroaromatic group, which is optionally mono- or polycyclic,
$Ar^7$ is the same or different and is a divalent aromatic or heteroaromatic group, which is optionally mono- or polycyclic,
$Ar^8$ is the same or different and is a divalent aromatic or heteroaromatic group, which is optionally mono- or polycyclic,
$Ar^9$ is the same or different and is a divalent aromatic or heteroaromatic group, which is optionally mono- or polycyclic,
X is the same or different and is oxygen, and
n is an integer greater than or equal to 10.

15. The membrane according to claim 1, wherein the polyoxazole, is a polybenzoxazole.

16. The membrane according to claim 1, wherein, in step iii), a polymer comprising repeat units of the formula

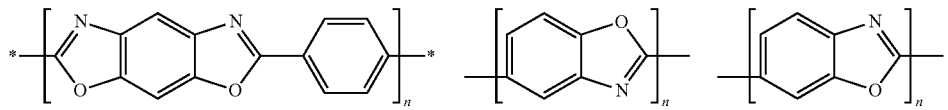

where n in each case is an integer greater than or equal to 10 is formed.

17. The membrane according to claim 1, wherein the hydrolysis in step iv) is effected at temperatures between 0° C. and 200° C., in the presence of humidity or water and/or water vapor.

18. The membrane according to claim 1, wherein the duration of the hydrolysis in step iv) is between 10 seconds and 300 hours.

19. The membrane according to claim 1, wherein, in step iii), a layer is obtained with a thickness of 20 and 4000 μm.

20. The membrane according to claim 1, wherein the membrane present after step iv) has a thickness between 15 and 3000 μm.

21. The membrane according to claim 1, wherein the hydrolysis in step iv) is effected at temperatures between room temperature (20° C.) and 90° C., in the presence of humidity or water and/or water vapor and the duration of the hydrolysis in step iv) is between 1 minute to 200 hours and, in step iii), layer is obtained with a thickness of between 50 and 3000 μm and the membrane present after step iv) has a thickness between 20 and 1500 μm.

22. The membrane according to claim 1, wherein the membrane comprises at least one further polymer from the group of polyazole, polysulfone, polyether sulfone or polyether ketone, where the polymers optionally also have sulfo groups.

23. A membrane electrode assembly comprising at least one electrode and at least one membrane according to claim 1.

24. A fuel cell comprising one or more membrane electrode assemblies according to claim 23.

25. The membrane according to claim 1, wherein the content of polyoxazoles is between 5 and 10% by weight and the content of phosphoric acid between 50 and 60% by weight, and the remaining amount is water.

* * * * *